(12) United States Patent
West et al.

(10) Patent No.: US 11,774,038 B2
(45) Date of Patent: Oct. 3, 2023

(54) MOUNTING ASSEMBLY

(71) Applicants: Christian J West, Mukwonago, WI (US); Timothy A Newman, Big Bend, WI (US)

(72) Inventors: Christian J West, Mukwonago, WI (US); Timothy A Newman, Big Bend, WI (US)

( * ) Notice: Subject to any disclaimer, the term of this patent is extended or adjusted under 35 U.S.C. 154(b) by 0 days.

(21) Appl. No.: 17/342,475

(22) Filed: Jun. 8, 2021

(65) Prior Publication Data
US 2022/0390065 A1    Dec. 8, 2022

(51) Int. Cl.
*F16M 13/02*    (2006.01)
*F16M 11/20*    (2006.01)
*F16M 11/24*    (2006.01)
*G10K 11/00*    (2006.01)
*F16B 2/06*     (2006.01)

(52) U.S. Cl.
CPC ...... *F16M 13/022* (2013.01); *F16M 11/2035* (2013.01); *F16M 11/24* (2013.01); *F16B 2/06* (2013.01); *F16M 2200/00* (2013.01); *G10K 11/004* (2013.01)

(58) Field of Classification Search
CPC .. F16M 13/022; F16M 11/2035; F16M 11/24; F16M 13/00; F16M 11/2085; F16M 11/2092; F16M 2200/02; F16B 2/06
See application file for complete search history.

(56) References Cited

U.S. PATENT DOCUMENTS

| | | | | |
|---|---|---|---|---|
| 2,431,100 A * | 11/1947 | Woods | ..................... | G01B 3/00 269/48 |
| 2,599,269 A * | 6/1952 | Markle | ............. | F16M 11/2064 248/404 |
| 4,158,489 A * | 6/1979 | Gottschalk | ............. | F16M 13/04 396/420 |
| 4,474,439 A * | 10/1984 | Brown | ................... | F16M 11/10 396/428 |
| 5,243,370 A * | 9/1993 | Slater | ..................... | F16M 11/24 396/421 |
| 5,275,364 A * | 1/1994 | Burger | ..................... | F16L 3/00 396/428 |
| 7,240,885 B1 * | 7/2007 | Sullivan | ................ | E04G 25/061 248/351 |
| 7,744,046 B1 * | 6/2010 | Lundy | ..................... | B60R 11/02 248/219.2 |
| 8,094,520 B2 * | 1/2012 | Bradley | ............... | G10K 11/006 367/173 |
| 2012/0234992 A1 * | 9/2012 | Vanover | ............... | H01Q 1/1207 248/201 |

* cited by examiner

*Primary Examiner* — Tan Le

(57) ABSTRACT

A mounting assembly includes a mounting block. A first shaft is supported by the mounting block and movable about a first rotational axis and a first extension axis with respect to the mounting block. A second shaft is coupled to the first shaft and movable about a second rotational axis.

18 Claims, 3 Drawing Sheets

MOUNTING ASSEMBLY

BACKGROUND

Technical Field

The present disclosure relates generally to a mounting assembly, such as a mounting assembly for a marine sensor.

Background

Sonar transducers are commonly used for detecting underwater features in marine applications, such as depth, obstacles, fish, or the like. It is challenging to provide a mounting system that adapts to different mounting configurations and provides flexibility for sensor orientation.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

DETAILED DESCRIPTION

Figure 2:
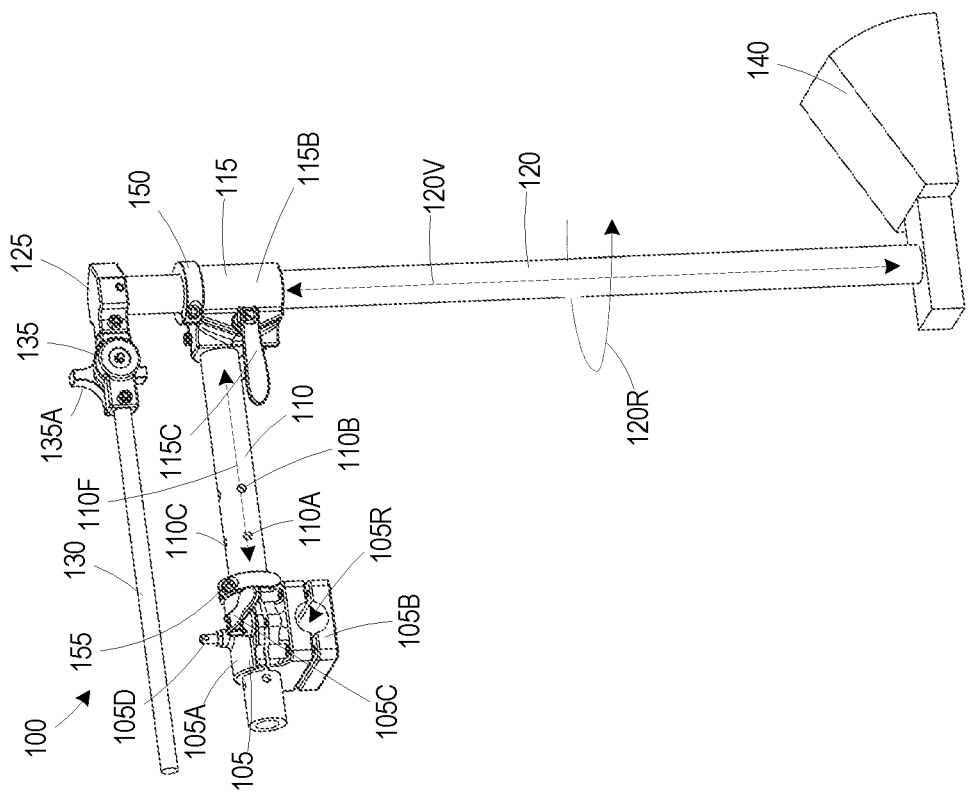
FIGS. 1 and 2 are isometric views of a mounting assembly, in accordance with some embodiments.
Figure 1:
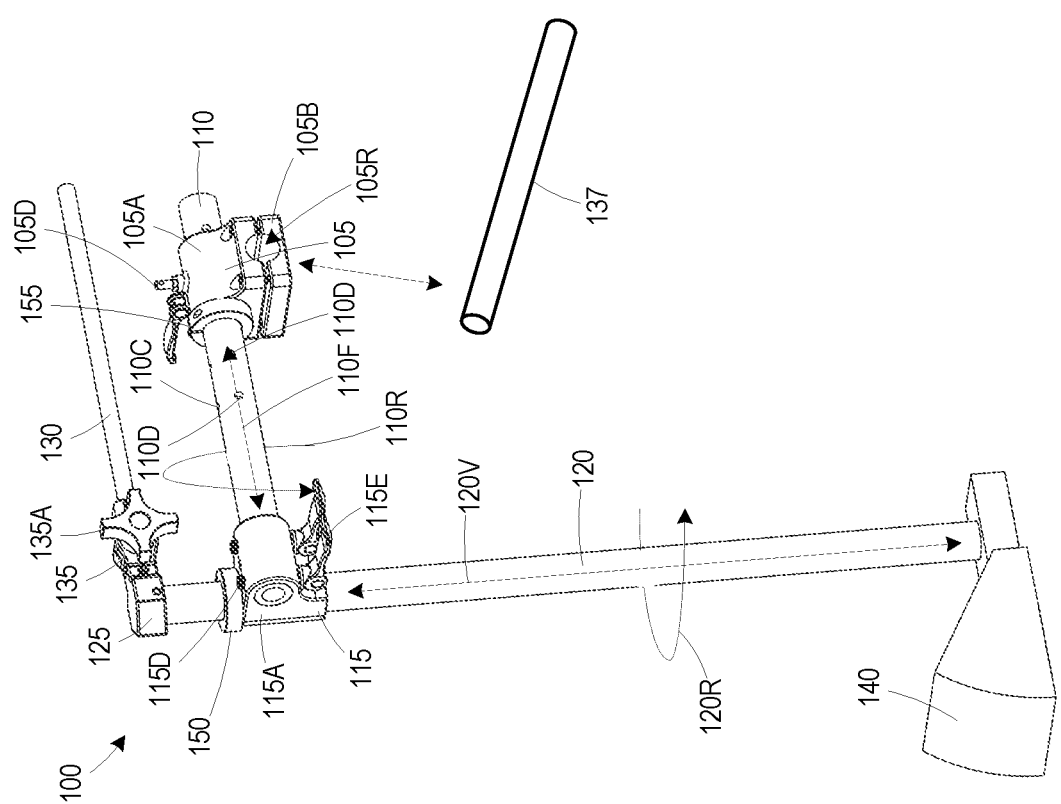
Figure 4:
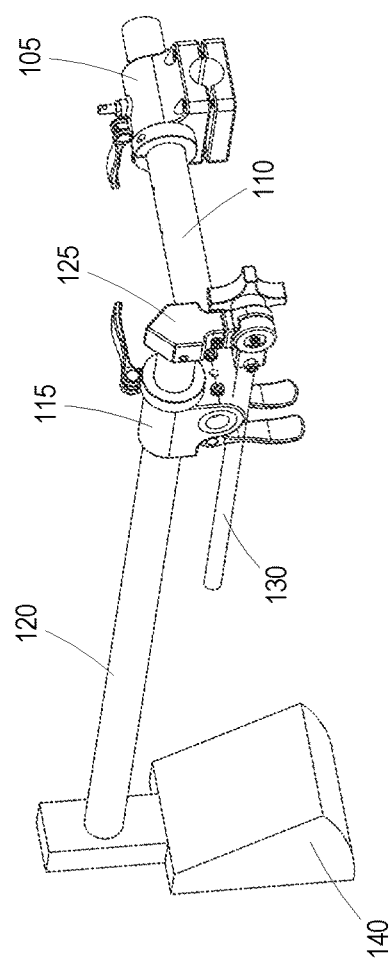
FIG. 4 is an isometric view of the mounting assembly with the probe shaft in the stowed position, in accordance with some embodiments.

FIGS. 1-7 illustrate example embodiments of a mounting assembly 100. FIGS. 1 and 2 are isometric views of the mounting assembly 100, in accordance with some embodiments. In some embodiments, the mounting assembly 100 comprises a mounting block 105 that supports an extension shaft 110, a rotation mount 115 that is mounted to the extension shaft 110 and supports a probe shaft 120, a handle mount 125 that mounts a handle 130 to the probe shaft 120, and a hinge assembly 135 that allows rotation of the handle 130. In some embodiments, the probe shaft 120 is configure to allow mounting of a probe 140, such as a sonar transducer.

In some embodiments, the probe shaft 120 is rotatable about a rotation axis 120R to allow radial positioning of the probe 140. The rotation mount 115 comprises a first member 115A interfacing with a second member 115B to engage the probe shaft 120. In some embodiments, the rotation mount 115 comprises an operator 115C, such as a cam nut, that rotates to pull the first member 115A toward the second member 115 to apply a clamping force and adjust the friction applied by the rotation mount 115 to the probe shaft 120 to resist rotational movement of the probe shaft 120. In some embodiments, a clamp 150 is mounted on the probe shaft 120 above the rotation mount 115 to set the vertical extension of the probe shaft 120 along an extension axis 120V. For example, changing the position of the clamp 150 adjusts the depth of the probe 140 in the water by changing the vertical extension along the extension axis 120V.

In some embodiments, the first member 115A of the rotation mount 115 engages the extension shaft 110. In some embodiments, the first member 115A defines a cylindrical recess that receives an end of the extension shaft 110. In some embodiments, bolts 115D pass through the first member 115A and the extension shaft 110 to secure the extension shaft 110 in the first member 115A of the rotation mount 115. In some embodiments, cam nuts 115E secure the bolts 115D.

Figure 3:
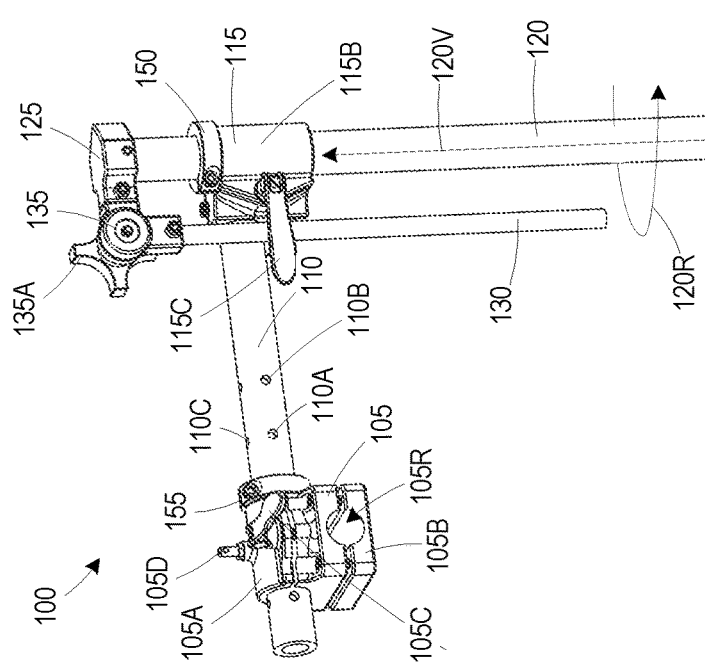
FIG. 3 is an isometric view of the mounting assembly with the handle in the stowed position, in accordance with some embodiments.

In some embodiments, the hinge assembly 135 allows rotation of the handle 130, such as to allow the handle 130 to be rotated from an operating position where the handle 130 is perpendicular to the probe shaft 120 to a stowed position where the handle 130 is parallel to the probe shaft 120. In some embodiments, the hinge assembly 135A comprises a knob 135A that controls friction applied by the hinge assembly 135 to allow rotation of the handle 130 or to lock the position of the handle 130. FIG. 3 illustrates the handle 130 in a stowed position, according to some embodiments.

In some embodiments, the mounting block 105 comprises a top member 105A and a bottom member 105B that facilitate mounting of the mounting assembly 100 to a surface, such as a surface on a boat. In some embodiments, the mounting block 105 defines an opening for receiving the extension shaft 110 and an operator 105C, such as a cam nut, that interfaces with a bolt (not visible) that extends through the top member 105A and changes a size of the opening to controls friction applied to the extension shaft 110 by the top member 105A. As illustrated in FIGS. 1 and 2, the top member 105A and the bottom member 105B define a recess 105R that facilitates attaching the mounting block 105 to a surface 137, such as a boat railing. In some embodiments, the recess 105R may have a different cross-sectional shape or the bottom member 105B may have a different configuration (see FIGS. 5-7) depending on the surface 137 to which the mounting block is attached. For example, the recess 105R may have a rectangular shape. In some embodiments, the top member 105A and the bottom member 105B are secured to one another by fasteners, such as bolts.

In some embodiments, the extension shaft 110 is rotatable about a rotation axis 110R to allow rotational positioning of the probe shaft 120. For example, the probe shaft 120 may be rotated into various radial positions such as the fully down position illustrated in FIGS. 1 and 2 and a stowed position illustrated in FIG. 4. In some embodiments, the extension shaft 110 comprises clocking holes 110A-110D that allow radial positioning and extension positioning of the extension shaft 110, and thereby the radial positioning and extension positioning of the probe shaft 120. The mounting block 105 supports a pin 105D that engages a selected clocking hole 110A-110D to set the position of the extension shaft 110. For example, selecting between the clocking hole 110A and the clocking hole 110B varies the extension of the extension shaft, and thereby the extension of the probe shaft 120, relative to the mounting block 105, along an extension axis 110F. Selecting between the clocking hole 110C and the clocking hole 110D sets the rotational position of the extension shaft relative to the rotational axis 110R, and thereby the rotational position of the probe shaft 120. In some embodiments, a clamp 155 is provided on the extension shaft 110 to set the extension position along the extension axis 110F by interfacing with the mounting block 105 to limit movement of the extension shaft 110 along the extension axis 110F, thereby facilitating easier interfacing with the clocking holes 110A-110D to set the rotational position once the extension position is selected.

Figure 5:
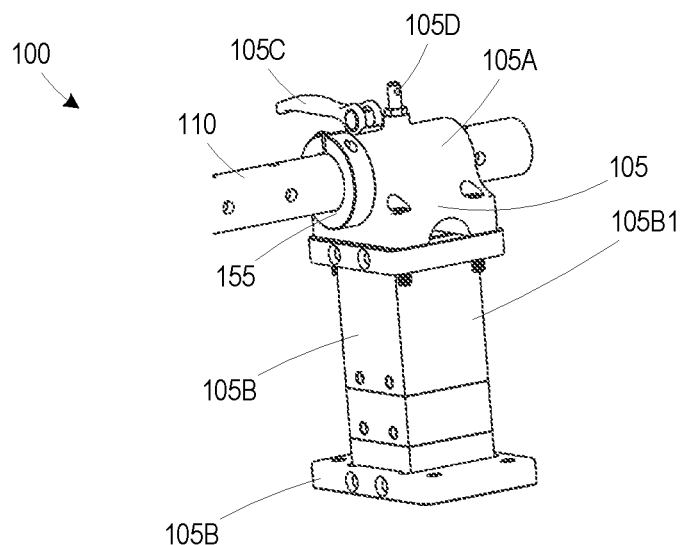
FIGS. 5-7 are isometric views of embodiments of mounting blocks of the mounting assembly, in accordance with some embodiments.
Figure 6:
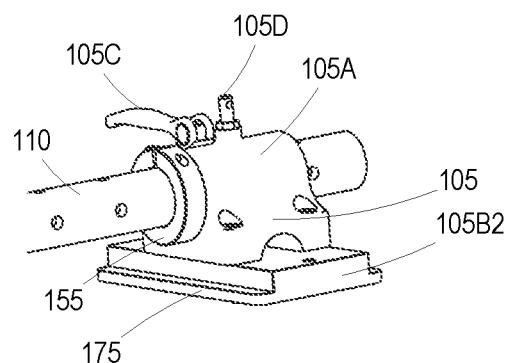
Figure 7:
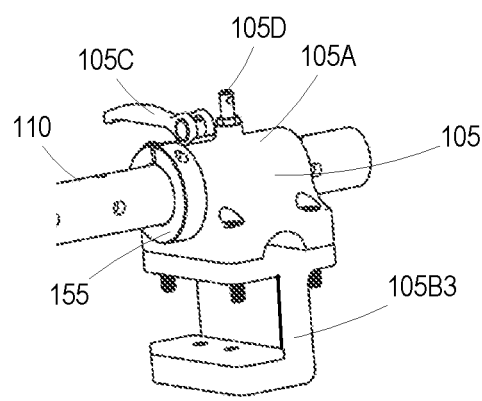

FIGS. 5-7 are isometric views of embodiments of mounting blocks 105 of the mounting assembly 100, in accordance with some embodiments. Referring to FIG. 5, a bottom member 105B1 of the mounting block 105 comprises a riser 160 and a plate 165. In some embodiments, the plate 165 is fastened (e.g., by bolts) to a deck of a boat, such as a pontoon boat. The riser 160 sets the height of the extension shaft 110 above the deck.

Referring to FIG. 6, a bottom member 105B2 of the mounting block 105 comprises a track plate 170. In some embodiments, the track plate 170 includes flanges 175 that engage a corresponding track on a boat.

Referring to FIG. 7, a bottom member 105B3 of the mounting block 105 comprises a gunwale clamp 180 that engages a gunwale, or side rail, of a boat. In some embodiments, the gunwale clamp 180 comprises a C-shaped member.

In some embodiments, materials of the mounting assembly are selected to absorb forces that may be encountered in the operating environment, such as impacts with objects in the water, the dock, or other boats. In some embodiments, the extension shaft 110 and/or the probe shaft 120 comprise an elastically deformable material, such as a composite material. In some embodiments, the composite material comprises a fiberglass pultrusion.

According to some embodiments, a mounting assembly includes a mounting block. A first shaft is supported by the mounting block and movable about a first rotational axis and a first extension axis with respect to the mounting block. A second shaft is coupled to the first shaft and movable about a second rotational axis.

According to some embodiments, a mounting assembly includes a mounting block. A first shaft is supported by the mounting block and includes a first clocking hole at a first rotational position and a first extension position along an extension axis of the first shaft, a second clocking hole at a second rotational position and at the first extension position, and a third clocking hole at one of the first rotational position or the second rotational position and at a second extension position along the extension axis of the first shaft. The mounting block selectively engages one of the first clocking hole, the second clocking hole, or the third clocking hole. A rotation block is coupled to the first shaft. A second shaft is supported by the rotation block and rotatable about a first rotation axis.

According to some embodiments, a method includes attaching a mounting block to a surface, engaging a first shaft with the mounting block at one of a first plurality of selectable rotational positions about a first rotational axis and at one of a second plurality of positions along an extension axis of the first shaft, coupling a second shaft to the first shaft, wherein the second shaft is movable about a second rotational axis, and coupling a probe to the second shaft.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A mounting assembly, comprising:
   a mounting block;
   a first shaft supported by the mounting block and movable about a first rotational axis of the first shaft and a first extension axis with respect to the mounting block;
   a second shaft coupled to the first shaft and movable about a second rotational axis of the second shaft;
   a handle coupled to the second shaft; and
   a hinge assembly coupled between the handle and the second shaft to allow rotation of the handle from an operating position where the handle is perpendicular to the second shaft to a stowed position where the handle is parallel to the second shaft.

2. The mounting assembly of claim 1, wherein:
   the first shaft comprises a first clocking hole at a first rotational position and a second clocking hole at a second rotational position, and
   the mounting block comprises a pin operable to engage one of the first clocking hole or the second clocking hole.

3. The mounting assembly of claim 1, wherein:
   the first shaft comprises a first clocking hole at a first extension position along the first extension axis and a second clocking hole at a second extension position along the first extension axis, and
   the mounting block comprises a pin operable to engage one of the first clocking hole or the second clocking hole.

4. The mounting assembly of claim 1, comprising a clamp attached to the first shaft, wherein the clamp interfaces with the mounting block to limit movement of the first shaft along the extension axis.

5. The mounting assembly of claim 1, comprising a rotation mount coupling the first shaft to the second shaft and supporting the second shaft and allow rotational movement of the second shaft about the second rotational axis.

6. The mounting assembly of claim 5, comprising a clamp attached to the second shaft, wherein the clamp interfaces with the rotation mount to limit movement along of the second shaft along a second extension axis.

7. The mounting assembly of claim 5, wherein the rotation mount comprises:
   a first member and a second member engaging the second shaft; and
   an operator to move the first member toward the second member to adjust frictional force applied to the second shaft by the rotation mount to resist rotational movement of the second shaft about the second rotational axis.

8. The mounting assembly of claim 1, wherein the mounting block comprises:
an upper member defining an opening for receiving the first shaft;
an operator to reduce a size of the opening to adjust frictional force applied to the first shaft by the upper member to resist movement of the first shaft.

9. The mounting assembly of claim 1, wherein the mounting block comprises:
an upper member defining an opening for receiving the first shaft; and
a lower member coupled to the upper member.

10. The mounting assembly of claim 9, wherein the upper member and the lower member define a recess.

11. The mounting assembly of claim 10, wherein the recess comprises a cylindrical recess.

12. The mounting assembly of claim 9, wherein the lower member comprises a riser and a plate.

13. The mounting assembly of claim 9, wherein the lower member comprises a track plate.

14. The mounting assembly of claim 9, wherein the lower member comprises a gunwale clamp.

15. The mounting assembly of claim 14, wherein the gunwale clamp is C-shaped.

16. The mounting assembly of claim 1, wherein at least one of the first shaft or the second shaft comprises an elastically deformable material.

17. A mounting assembly, comprising:
a mounting block;
a first shaft supported by the mounting block, the first shaft comprising:
a first clocking hole at a first rotational position and a first extension position along an extension axis of the first shaft;
a second clocking hole at a second rotational position and at the first extension position; and
a third clocking hole at one of the first rotational position or the second rotational position and at a second extension position along the extension axis of the first shaft, wherein the mounting block selectively engages one of the first clocking hole, the second clocking hole, or the third clocking hole;
a rotation block coupled to the first shaft;
a second shaft supported by the rotation block and rotatable about a first rotation axis of the second shaft;
a handle coupled to the second shaft; and
a hinge assembly coupled between the handle and the second shaft to allow rotation of the handle from an operating position where the handle is perpendicular to the second shaft to a stowed position where the handle is parallel to the second shaft.

18. A method, comprising:
attaching a mounting block to a surface;
engaging a first shaft with the mounting block at one of a first plurality of selectable rotational positions about a first rotational axis of the first shaft and at one of a second plurality of positions along an extension axis of the first shaft;
coupling a second shaft to the first shaft, wherein the second shaft is movable about a second rotational axis of the second shaft;
coupling a probe to the second shaft;
coupling a handle to the second shaft with a hinge assembly coupled between the handle and the second shaft; and
rotating the handle using from an operating position where the handle is perpendicular to the second shaft to a stowed position where the handle is parallel to the probe shaft.

* * * * *